United States Patent [19]

Jakobsen et al.

[11] Patent Number: 4,580,968

[45] Date of Patent: Apr. 8, 1986

[54] APPARATUS FOR PRODUCING A TUBULAR OBJECT OF POLYETHYLENE TEREPHTHALATE OR SIMILAR THERMOPLASTIC MATERIAL FROM A TUBULAR BLANK OF MATERIAL

[75] Inventors: Kjell M. Jakobsen, Skanör; Claes T. Nilsson, Loddeköpinge, both of Sweden

[73] Assignee: PLM AB, Malmo, Sweden

[21] Appl. No.: 489,750

[22] Filed: Apr. 29, 1983

Related U.S. Application Data

[62] Division of Ser. No. 264,665, May 18, 1981, Pat. No. 4,405,546.

[30] Foreign Application Priority Data

May 29, 1980 [SE] Sweden .................................. 8004003

[51] Int. Cl.[4] ............................................. B29C 17/00
[52] U.S. Cl. ...................................... 425/393; 264/532; 425/384; 425/DIG. 218
[58] Field of Search ................ 264/159, 527, 532, 291, 264/296, 320, 322, 323, 346; 425/392, 393, 383, 384, DIG. 218; 72/349

[56] References Cited

U.S. PATENT DOCUMENTS

| | | | |
|---|---|---|---|
| 1,886,935 | 11/1932 | Böhle ................................ | 264/292 |
| 2,249,510 | 7/1941 | Welker .............................. | 264/291 |
| 2,338,210 | 1/1944 | Snyder .............................. | 264/159 |
| 3,205,289 | 9/1965 | Carpenter ........................ | 264/291 |
| 3,651,186 | 3/1972 | Hall .................................. | 264/532 |
| 3,757,718 | 9/1973 | Johnson ............................ | 264/292 |
| 3,806,301 | 4/1974 | Osterhagen et al. ............ | 425/384 |
| 4,028,037 | 6/1977 | Dawson ........................... | 425/392 |
| 4,108,937 | 8/1978 | Martineu et al. ............... | 264/529 |
| 4,131,407 | 12/1978 | de Putter et al. ................ | 425/393 |
| 4,198,370 | 4/1980 | Suzuki ............................. | 264/291 |
| 4,212,204 | 7/1980 | St Amand ........................ | 264/291 |
| 4,250,138 | 2/1981 | Okita ............................... | 264/292 |
| 4,260,567 | 4/1981 | Poppe et al. ..................... | 264/346 |

FOREIGN PATENT DOCUMENTS 953734 4/1964 United Kingdom .
1352002 5/1974 United Kingdom .

Primary Examiner—Jay H. Woo
Assistant Examiner—J. Fortenberry
Attorney, Agent, or Firm—Roberts, Spiecens & Cohen

[57] ABSTRACT

An object is produced from a tubular blank (10,15,17) of thermoplastic material of polyester or polyamide, preferably of polyethylene terephthalate by reducing the thickness of amorphous material in one or several areas of the blank by means of one or several consecutive re-shaping operations. A mechanical shaping device (23,29,71,81) moves a transitional zone (13,14,113) situated between thicker and thinner material along the blank and simultaneously elongates the blank in the moving direction of the transitional zone while reducing the thickness. After the last re-shaping operation the thinner material preferably has an oriented state. During the re-shaping operation the temperature of the material in the transitional zone (13,14,113) is controlled at a level which, immediately before the re-shaping operation, is within or close to the range of the glass transition temperature (TG). In one embodiment the reduction of the wall thickness of the material is begun in a track (12) in the wall of the blank and continues symmetrically around the track. Clamping devices (41,51,61) are used to maintain the axial position of the blank. The blank is suitable for re-shaping for instance, into a container in which the mouth also consists of oriented material.

25 Claims, 15 Drawing Figures

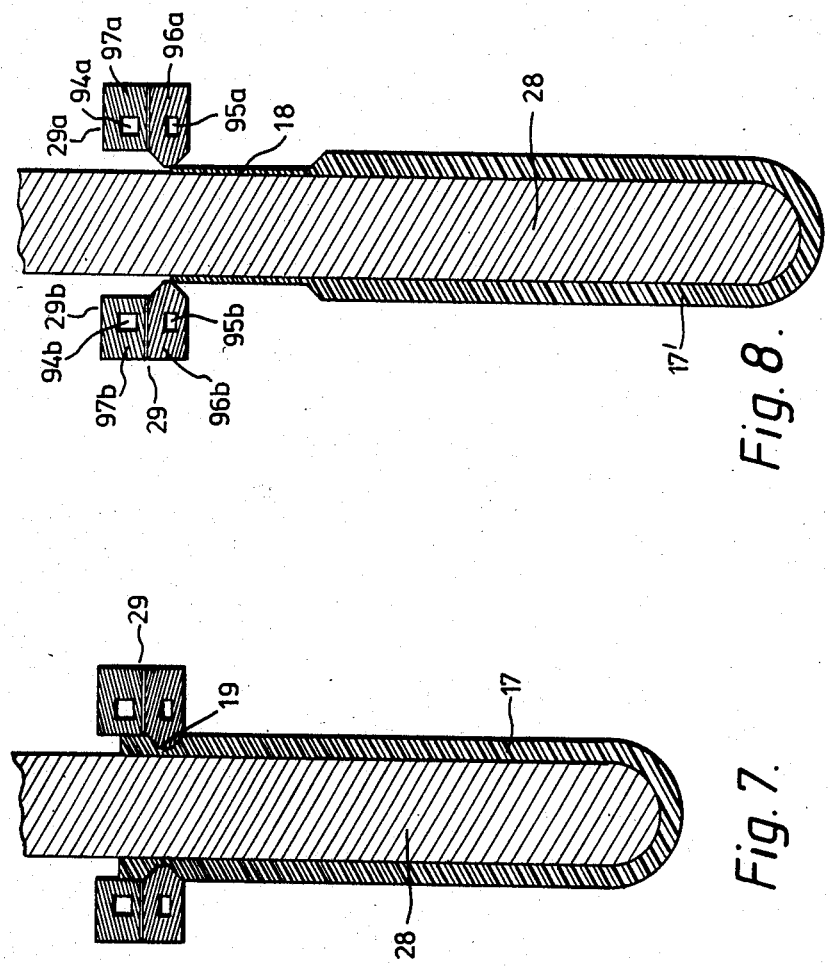

APPARATUS FOR PRODUCING A TUBULAR OBJECT OF POLYETHYLENE TEREPHTHALATE OR SIMILAR THERMOPLASTIC MATERIAL FROM A TUBULAR BLANK OF MATERIAL

This application is a division of application Ser. No. 264,665, filed May 18, 1981, now issued as U.S. Pat. No. 4,405,546.

FIELD OF THE INVENTION

The present invention relates to apparatus for producing a tubular object of polyethylene terephthalate or a similar thermoplastic material from a tubular blank of amorphous material. The object has one or more cylindrical areas of material in which the thickness of the material in the blank has, in the case of polyethylene terephthalate, been reduced by one or more shaping operations until it is approximately ⅓ of the original thickness of the material. In certain applications, the thickness of the material is reduced along the entire length of the object. In the areas with reduced wall thickness the material is axially oriented and has, in the case of polyethylene terephthalate, a crystallinity of less than approximately 30%, usually of the order of 10–25%. The initial temperature of the material during shaping is preferably below the glass transition temperature (TG) and the shaping operation takes place with the temperature of the material controlled in the area of shaping, where the material is in surface contact with an external draw ring and/or an internal shaping device.

PRIOR ART

Previously disclosed in Swedish Patent application SE No. 7905043-1 corresponding to U.S. Pat. No. 4,380,525 is an object in which the wall thickness preferably at a central point of said object has been reduced to approximately ⅓ of the original thickness of the material. The reduction in thickness is produced by clamping each end of a tubular blank in which the material is at an initial temperature below the glass transition temperature (TG) in two jaws which are then moved apart. By causing an annular area of the material to have a higher temperature than the surrounding material, the obtained material properties of the area will cause the reduction in thickness to commence in the area during the stretching operation. In certain applications, the internal diameter of the blank is stabilized by the use of an internal mandrel. The process as disclosed will produce an object in which the material is axially oriented and has a crystallinity of less than approximately 30%, usually being of the order of 10–25%.

Already disclosed in U.S. Pat. No. 4,374,878 is a method for causing the thickness of the material in a tubular blank to be reduced mechanically by the use of an external device. The device consists of one or more rollers which make contact with the external and/or internal surface of the blank with such force that the desired reduction in thickness will occur as the initial temperature of the material approaches the glass transition temperature. The external device is moved around the periphery of the blank and along the axis of the blank simultaneously. This method will also produce an object in which the crystallinity in the areas of reduced material thickness will be less than approximately 30% and will be of the order of 10–25%.

However, the material will not have been oriented axially to such a high degree as when the process described in the previous paragraph is used.

In accordance with the inventions described above, certain applications will produce objects which differ in respect of the transitional zone between stretched and non-stretched material. This condition will arise, for instance, if a central section of a tubular blank is stretched while the material in the blank is at an initial temperature below the glass transition temperature (TG) and if the blank is then separated into two parts so as to form two separate objects. The difference is due to the fact that one of the objects contains the start zone for the yielding of material produced by the stretching operation, while the other object contains the stop zone for the yielding of material.

When practicing the invention in accordance with U.S. Pat. No. 4,380,525 an annular transitional zone between the thinner material which has been stretched and the thicker material which has not been stretched will normally be produced. In the zone the surface of the material will form an angle of approximately 45° with the surfaces of the stretched and non-stretched material respectively. Axially displaced tapering areas will occasionally be produced in the essentially annular transitional zone during the drawing operation, the presence of said areas usually requiring the object to be scrapped.

SUMMARY OF THE INVENTION

The present invention contemplates apparatus for producing tubular objects with areas of the wall in which, in the case of polyethylene terephthalate, the original thickness has been reduced to approximately ⅓ of its initial value, in which areas the material is oriented mainly along the axis of the object only, in which areas crystallinity is less than approximately 30% and is preferably within the range of 10–25%, and in which areas the crystallinity produced in the material by the aforementioned orientation will achieve a maximum value of 17%. The material in these areas will also have been oriented mainly along the axis of the object.

The speed at which the thickness of the material is reduced is greater in accordance with the present invention than by previously disclosed methods. Furthermore, the transitional zone between material with the original wall thickness and material with reduced wall thickness will always have a predetermined shape, at the same time as the length of the sections with reduced wall thickness will always be precisely defined due to the fact that the re-shaping of the blank in the transitional zone itself is mechanically controlled. For example, when starting from a tubular blank in order to make an object to be used for two preforms which face each other, the rate of production will additionally be doubled by starting the drawing operation at a central point and by then continuing it simultaneously towards the two ends of the tube. The object which has thus been produced may be cut and the cut sections sealed to form two preforms for future processing, in which the transitional zone between material with the original wall thickness and material with reduced wall thickness will always have a predetermined shape and will always contain material with characteristics which are identical from one preform to another.

In accordance with the present invention it is also possible to produce an object in which the thickness of the material is reduced along the entire length of the object or in one or more cylindrical sections of the object. The object is in the form of a tube which is open at both ends or, in certain applications, in the form of a tube which has been sealed at one end. The object is mainly intended to be moulded into containers, whereby each single object is formed into either a single container or a number of containers. In the latter case, the object is divided into a number of parts which are then moulded into containers.

The production of an object of polyethylene terephthalate in accordance with the present invention starts with a tubular blank or a similar thermoplastic material. The material in this blank will be in an amorphous state. In one single operation or a number of consecutive operations the thickness of the material in the blank is reduced to approximately ⅓ of its original thickness. This reduction in thickness takes place either along the entire length of the blank or in one or more sections of the blank. Use is made of a draw ring in certain applications, in which the relationship between the internal circumference of the draw ring and the external circumference of the blank is such that the thickness of the material will be reduced as the draw ring is moved axially along the blank. The temperature of the material immediately before the reduction in thickness takes place must be in the range of or lower than the glass transition temperature which will be abbreviated as TG hereafter, and should deviate from TG preferably by no more than 15° C. Although the technical effect of the present invention may be achieved at a much lower temperature, it is advantageous to use an initial temperature close to TG, for instance a temperature which is between 1° to 3° C. below TG, since material at this initial temperature will permit the draw ring to be moved at high speed. In certain typical applications, the draw ring operates in conjunction with an internal shaping device located inside the blank, whereby the external dimension of the shaping device fits the internal surface of the blank. In other applications only the internal shaping device is used. The thickness of the material in the blank is reduced by contact with the draw ring and/or the internal shaping device as said draw ring and/or shaping device is moved axially along the blank. During the re-shaping operation a transitional zone is formed between material with the original thickness and material with reduced thickness, said transitional zone gradually moving axially along the blank. The material in the transitional zone is kept at a temperature close to TG during the re-shaping operation by the transfer of heat to the draw ring and/or the shaping device located inside the tubular blank. In certain applications the material in the transitional zone is, however, allowed to assume a temperature which exceeds TG by no more than 30° C., and preferably by no more than 15° C.

In certain applications the material in the area adjacent to the transitional zone is cooled to a temperature below TG immediately after it has been reduced in thickness.

In accordance with the present invention, the possibility is offered of producing an object with areas with mainly monoaxial orientation and in which the material has been reduced in thickness and whose external circumference has been reduced and/or the internal circumference has been increased compared to the circumference of the corresponding sections of material in the blank.

In the case of sections with reduced wall thickness to be produced in areas situated between the ends of the blank, the reduction in thickness is begun by forming one or more peripheral grooves in the wall of the blank at the same time as external devices are used to subject the blank to tensile stress along its axis. This stretching operation reduces the wall thickness in the groove to about ⅓ of its original thickness at the same time that the blank is elongated axially. Further reduction of the thickness of the wall of the blank is produced by positioning the draw ring in the aforementioned groove or grooves and moving it axially along the blank. Certain applications use two rings, whereby the reduction in wall thickness takes place simultaneously from a specific groove outwards towards the two ends of the blank.

In the case of a blank which is sealed at one end and in which the wall thickness is to be reduced adjacent to the seal, the draw ring should preferably be moved from the seal towards the other end of the blank. In certain applications the reduction in thickness is allowed to continue along the entire length of the blank.

In those applications in which the blank is in the form of a tube open at both ends, this may be sealed in certain cases after the reduction in thickness by heating the material at one end of the object and then by press moulding the material in a mould which may be cup-shaped, for instance. German Patent DE PS No. 1 704 119 contains examples of methods suitable for achieving sealing of this kind.

The reduction of the thickness of the material in several stages is used mainly in the event that the material is so thick that problems arise in transferring sufficient heat away from the transitional zone. By reducing the thickness of the material a number of times before the final reduction in thickness is made, a thinner material will be produced which will facilitate the transfer of heat away from the transitional zone to the adjacent draw ring and/or internal shaping device.

Two draw rings are included in one device for producing an object in accordance with the invention. A mandrel around which a tubular blank is placed during the drawing operation is positioned axially inside the two draw rings. Separate clamping devices are also positioned near the end sections of the blank. Each draw ring consists of two draw ring halves which are moved by the driving device between an operating position in which the halves of the draw ring are in contact with each other and an open position in which the halves of the draw ring are separated from each other. The open position is used when inserting the tubular blank or removing the made object from the device.

Driving devices are also positioned in such a way as to move the draw rings and clamping devices axially along the blank. At least while the draw rings are moving towards the ends of the tubular blank, the movement of the draw rings is connected to the movement of the clamping devices in such a way that the draw ring and clamping device which are adjacent to each other are moved in the same direction and in such a way that the correlation between the speed of the respective draw ring and clamping device is determined by the reduction in thickness which it is wished to produce in the material in the tubular blank. For example, when reducing the wall thickness of the blank to ⅓ of its original thickness, the ratio between the speeds of the clamping device and the draw ring shall be ⅔, with a ratio of ½ when reducing the thickness of the material to ⅓ of its original thickness, etc.

The clamping devices are fitted with axially movable spring components against which the edges of the tubular blank make contact. Any longtitudinal tolerances which are present in the blank both before and during the drawing operation are absorbed by the spring components.

In one embodiment of the invention, each draw ring usually consists of three ring sections with a certain degree of thermal insulation between the sections. Each ring section is provided with channels for a fluid, said fluid either heating or cooling the ring section. The aforementioned mandrel is also provided with liquid channels. The central ring section includes that part of the draw ring against which the transitional zone between material with its original thickness and material with reduced wall thickness is formed during the drawing of the tubular blank. Of the neighboring ring sections, the one with the largest internal diameter is in contact with the material with its original thickness during the drawing operation, while the other ring section with the smallest internal diameter is in contact with the material with reduced thickness.

When drawing a tubular blank, said blank is positioned on the mandrel in such a way that it is held securely by the clamping devices. A central peripheral groove in the base of which the wall thickness has been reduced to approximately ⅓ of its original thickness is formed in he tubular blank in the manner described above. The draw ring halves are then moved to their operating position. The shape and the axial length of those parts of the draw rings which are introduced into the groove match the shape and the axial length of the groove. The material of the blank in the area which is to be drawn should preferably be heated to a temperature cloe to but below TG before the blank is positioned on the mandrel. The material will be raised to the correct drawing temperature through the contact surfaces formed between the material of the blank and the draw rings and mandrel.

During the actual drawing operation, the draw rings and the clamping devices are moved away from the groove by the driving devices, while the aforementioned relative speed between the draw rings and the clamping devices is maintained. Thus the thickness of the material in the blank will continue to be reduced by the draw rings for as long as movement continues. At the same time the blank is lengthened along its axis.

An essential factor relating to the device is the control of the temperature of the material in the transitional zone between amorphous material with the original wall thickness and material which has been reduced in thickness. The draw ring has an internal profile which matches the change in the thickness of the material which occurs in the transitional zone. The profile has been selected in such a way that it will form contact surfaces with the internal surface of the draw ring not only in the transitional zone, but also head of and after it during the drawing operation. The draw ring is able, in this way, to control the shape of the transitional surface in the transitional zone. The temperature of the material in the blank is regulated during the entire drawing operation by the transfer of heat between the material in the blank and the draw rings and/or the mandrel. It is particularly important that the section of the draw ring which is in contact with the material in the transitional zone should maintain the material in the blank at a temperature close to TG.

A simplified embodiment of the present invention makes use of a single draw ring which is moved from a starting groove preferably all the way to the edge at one of the ends of the blank. In this way an object is produced in which the wall thickness is reduced at one end only. This embodiment preferably makes use of an internal mandrel as a dolly which will take up the axial forces which arise as the wall thickness is reduced. The movement of the draw ring is interrupted in certain applications before it passes over the edge of the tubular blank. The edge will thus be bordered by a rim in which the wall thickness has not been reduced after the drawing operation is complete. The object which is produced in this way is suitable for use as a preform, possibly after a certain amount of re-shaping of the rim, i.e. which will become the edge of the mouth, for a container intended to be closed by means of a "crown cork", for instance. Before the object is moulded into a container, the area which will become the mouth is stabilized by heating and by thermal crystallization, with crystallization usually being allowed to continue until the material in the aforementioned rim becomes opaque.

In a preferred embodiment of the present invention the blank is provided with a starting track or groove of such axial length that space is provided in the track for a clamping device together with the draw ring or draw rings. At least during the initial stage of the movement of the draw ring or draw rings, the clamping device holds sections of the wall of the material in the base of the track pressed against the mandrel. In this way the position of the blank relative to the mandrel is fixed. In the embodiment of the present invention in which two draw rings are moved away from each other, the clamping device is designed to hold the wall of the blank in an area situated between the draw rings. By holding the blank securely against the mandrel, this will prevent any axial movement of the blank in relation to the mandrel which might arise depending on the axial forces which occur at the contact surfaces between the respective draw ring and the material in the transitional zone between the wall of the blank with reduced thickness and the wall of the blank with non-reduced thickness. Any movement could, for instance, lead to the disadvantage that in th variant of the invention in which an area surrounding the track has the thickness of its wall reduced, the area with reduced wall thickness may be positioned unsymmetrically in relation to the starting track.

The use of a clamping device in accordance with the previous paragraph offers the possibility of producing any desired axial length in the area in which the wall thickness of the material has been reduced. In certain applications this involves producing such a reduction in the thickness of the wall of the material along the entire length of the blank, whereas in other applications the reduction in thickness is interrupted before the draw ring or draw rings reach and pass beyond the end or ends of the blank. By leaving an area of amorphous material at the very end or ends of the blank, a section of material will be produced which is highly suitable, for example, for sealing to produce the base of a preform by the use of a method which is described in German Patent DE PS No. 1 704 119 or, after having been subjected to thermal crystallization, for forming a rim for use with the "crown cork" type of closure.

In an alternative embodiment, the draw ring is used to reduce the wall thickness of the material in a tubular blank with a sealed bottom, the mouth of which is already provided with a means of closure, for example screw threads. The blank in which the material is intended to be subjected to a reduction in thickness is produced by conventional method, for example by injection moulding or by extrusion followed by sealing and moulding the bottom and mouth. In certain applications, the starting track is formed in the manner described above, while in other applications a starting point or the starting track in whole or partly is produced during the injection moulding of the preform.

When using an external draw ring to reduce the thickness of the material in the wall of the blank, a certain reduction in the internal diameter of the blank will also be produced, as has already been mentioned. The mandrel inside the blank thus acts as a shaping device which will determine the extent of the reduction in diameter. Surprisingly, it has been found that, for material within the range of temperatures indicated above during the re-shaping operation, the contact between the wall of the material and the mandrel and produced by the contraction, generates relatively little contact pressure between the internal surface of the wall of the blank and the external surface of the mandrel, for which reason no problems are encountered in removing the finished blank from the mandrel after the shaping (drawing) of the blank is complete.

No internal mandrel is called for in certain types of application for the device, in which the object is allowed to assume an internal circumference which is smaller than its original circumference. By selecting an internal mandrel with an external circumference which is smaller than the internal circumference of the blank, it is possible in other typical applications to control the reduction in the internal circumference of the blank during the drawing operation to a value which is suitable for the envisaged specific application.

BRIEF DESCRIPTION OF THE FIGURES OF THE DRAWING

The present invention is described in greater detail with reference to a number of figures, in which

FIG. 7 shows a section through a tubular blank with a draw ring in the initial position prior to drawing the blank in a short section at one end;

FIG. 8 shows a section of the tubular blank in FIG. 7 with the draw ring in its final position;

DETAILED DESCRIPTION

Figure 1:
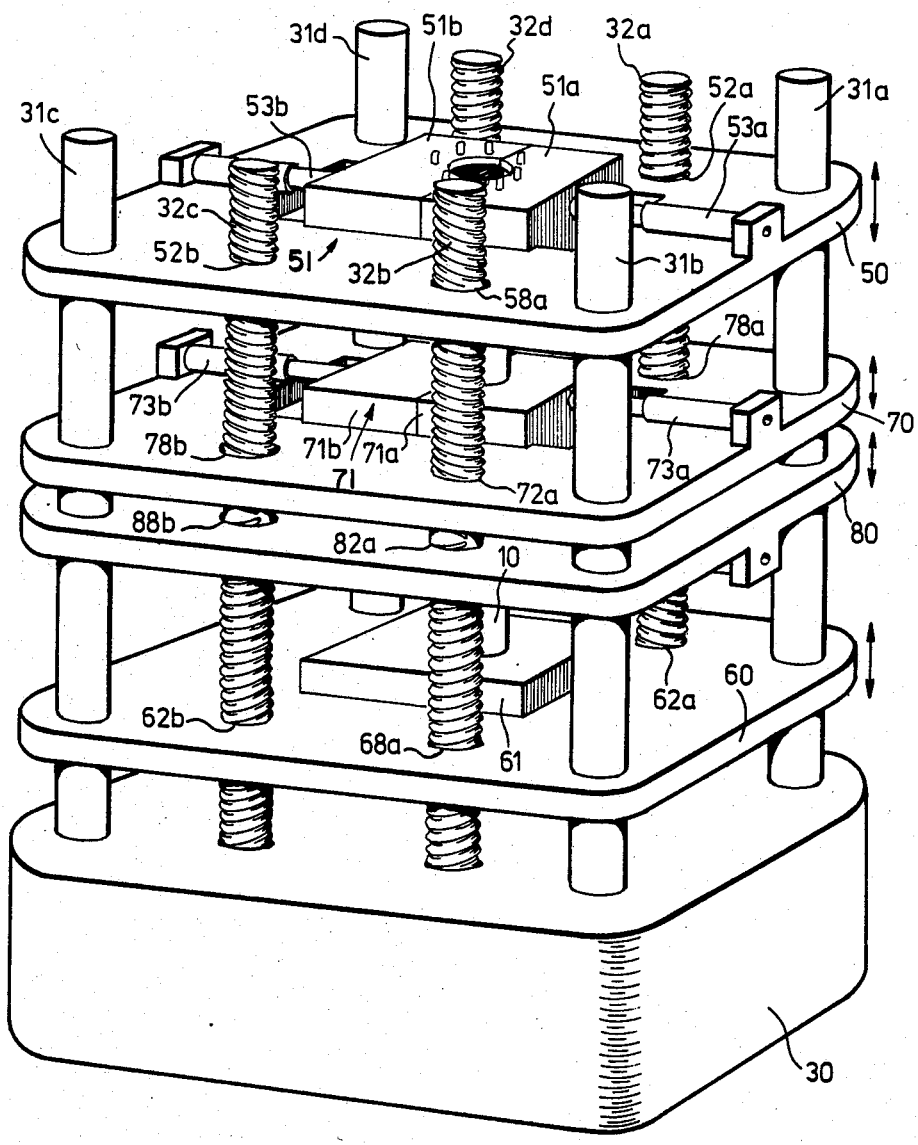
FIG. 1 shows a perspective view of a drawing device.

FIG. 1, which shows an overall perspective view of a drawing device in accordance with the present invention, includes a base 30 from which a number of guide pins 31a-31d project vertically. The rest of the description which follows will relate to the device in this position, although the concept of the invention is in no way restricted to a special position of this kind. The designations "upper" or "lower" or other similar designations are occasionally used below in connection with a variety of components, said designations being used only for the purpose of clarification.

The base is fitted with driving devices with gearing (not shown in the figure) for a number of drive screws 32a-32d which lie parallel with the guide pins. Four support plates 50,60,70,80 are positioned at right angles to the guide pins and the drive screws. Each support plate is fitted with bearings which fit the guide pins 31a-31d and threaded holes which operate in conjunction with a number of the drive screws 32a-32d. The threaded holes are shown at 52a,52b; 62a,62b; and 82a, the threaded hole in plate 80 engaged with screw 32d not being visible in the drawing. The plates are also provided with openings for those drive screws which are not in threaded contact with the actual support plate. The openings are arranged in pairs in the respective plates and the visible holes are seen at 58a,68a,7-8a,78b and 88b. The top and bottom support plates 50 and 60 are arranged to operate in conjunction with the two drive screws 32a and c, whereas the two interjacent support plates 70 and 80 are arranged to operate in conjunction with the two remaining drive screws 32b and d. Furthermore, the upper parts of the drive screws which operate in conjunction with the support plates 50 and 70 are threaded in opposite directions to the lower parts of the drive screws which operate in conjunction with the support plates 60 and 80. This means that as the drive screws are rotated the two upper support plates will move in the same direction, although this will be opposite the direction in which the two lower support plates move.

Since the top and bottom support plates are driven by the screws 32a and c and the two middle support plates are driven by the screws 32b and d, the speed at which the respective support plates move will be determined by the rotational speed and the pitch of the screws in conjunction with which the respective support plates operate. The pitch of the thread on the drive screws is selected in such a way that the top and bottom support plates will always move at a lower speed than the two plates in the middle. In the initial position, the two middle plates will be in close contact with each other and the top and bottom plates will be in positions which will allow movement to take place towards the ends of the guide pins. After movement has taken place, the middle support plates will have moved closer to the upper and lower support plate respectively.

The top support plate 50 and the bottom support plate 60 are provided with clamping devices 51 and 61, each of which holds one end of a tubular blank 10. The blank is provided with a preferably central peripheral starting track or groove 12 (FIG. 2) in which the thickness of the material is approximately ⅓ of its original thickness. The starting track is formed, preferably before the blank is positioned in the device, by the application of external pressure to the wall of the material, for instance by means of a number of interacting rollers, at the same time that the tubular blank is subjected to tensile stresses along its axis. When forming the starting track, the use of rollers in conjunction with the stretching operation produces a track with a predetermined axial length which is thus given a profile which is substantially identical with the profile of those parts of the draw rings which are introduced into the track (see description of FIG. 2 below) when re-shaping the blank into the object. The tubular blank is caused to lengthen axially when the starting track is formed.

The two middle support plates 70 and 80 are each fitted with a draw ring 71 and 81, with the latter draw ring being obscured in FIG. 1. The clamping device 51 of the top support plate and the draw rings 71,81 of the two middle support plates respectively consist of two halves 51a,b, 71a,b and 81a,b which are moved by the driving devices 53a,53b,73a,73b,83a,83b to and from closed position shown in the FIG. 1.

Figure 2:
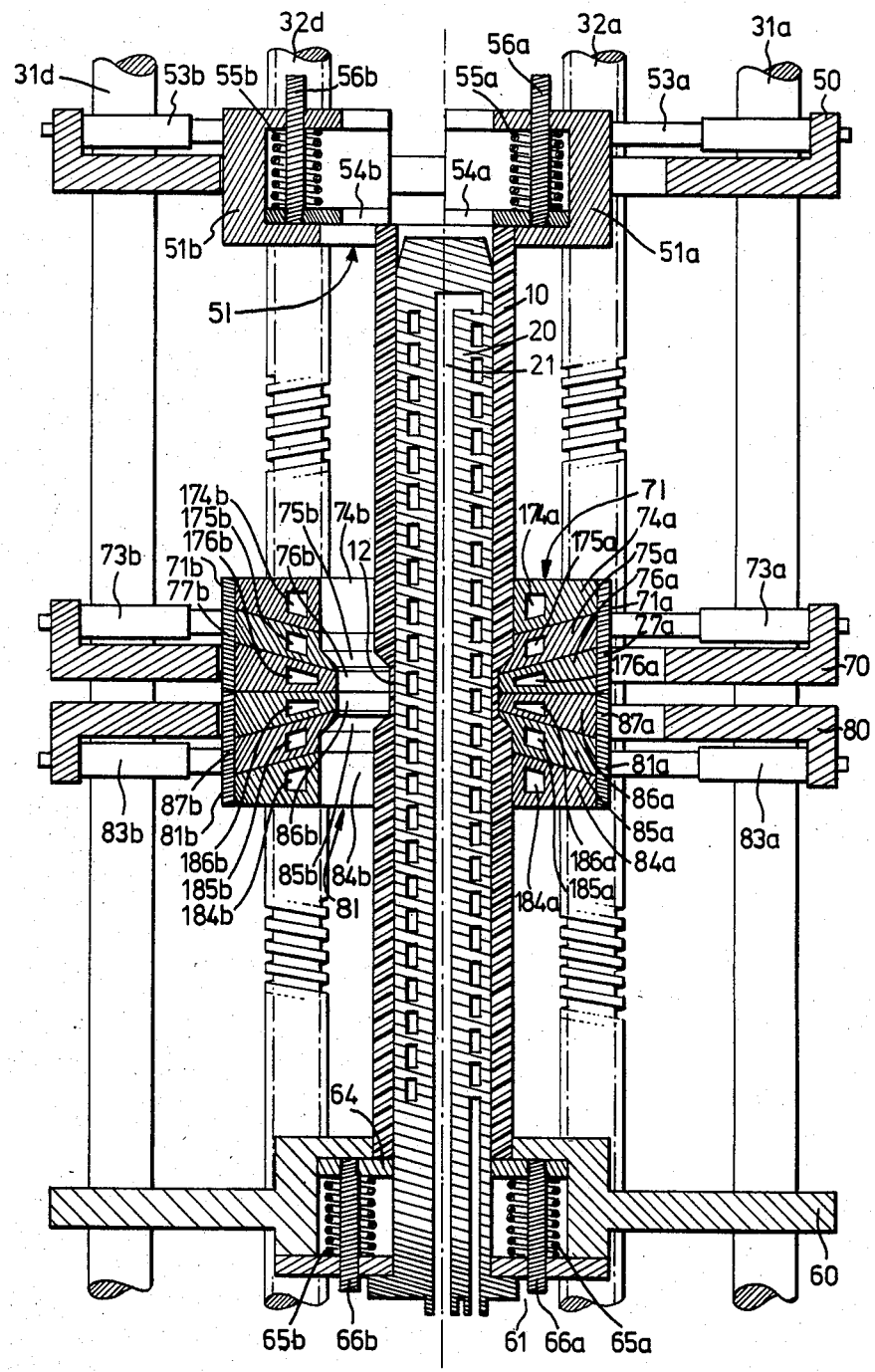
FIG. 2 shows a longitudinal section through the drawing device in FIG. 1 in which the draw rings of the drawing device are in the initial position before drawing.

In FIG. 2, which shows a longtitudinal section through the drawing device in accordance with FIG. 1, the left-hand part of the Figure portrays the device with the upper clamping device 51 and the two draw rings 71,81 in their open position, and the right-hand part of the Figure portrays the device with the upper clamping device 51 and the two draw rings 71,81 in their closed position (operating position).

The figure also shows the blank 10. At its center is the peripheral starting track 12 which is formed in accordance with the above description.

In addition to the details shown in FIG. 1, FIG. 2 shows that the upper and lower clamping devices 51,61 are respectively fitted with sprung support plates 54a,54b and 64 against which the end edges of the tubular blank 10 make contact. The required spring function is provided by springs 55a,55b and 65a,65b around the guiding devices 56a,56b and 66a,66b for the support plates 54a,54b and 64, with the guiding devices screwed firmly to the support plates.

FIG. 2 also shows that the two draw rings 71 and 81 consist of two draw ring halves 71a,b and 81a,b. Each draw ring is divided into three sections 74a,b,75a,b,-76a,b and 84a,b,85a,b,86a,b, each of which consists in turn of two ring section halves. The ring sections are separated from each other by a certain degree of thermal insulation. The ring sections are held together by means of ring casings 77a,b and 87a,b in such a way that they will combine to form the two halves of the draw rings. Each ring section is provided with channels 174a,b, 175a,b, 176a,b and 184a,b, 185a,b, 186a,b to permit the flow of liquid.

The draw ring sections are in the form of sections 74a,b and 84a,b with an internal circumference which matches the circumference of the material in the blank in the areas in which the thickness of the material has not been reduced, further sections 76a,b and 86a,b with an internal circumference which matches the circumference of the material in the blank in the areas in which the thickness of the material has been reduced, and further sections 75a,b and 85a,b which form contact surfaces with the material in the transitional zone between material in the blank which has and which has not been reduced in thickness.

Finally, FIG. 2 shows a mandrel 20 which is fitted in the internal surface of the blank 10 and which is provided with liquid channels 21.

Figure 3:
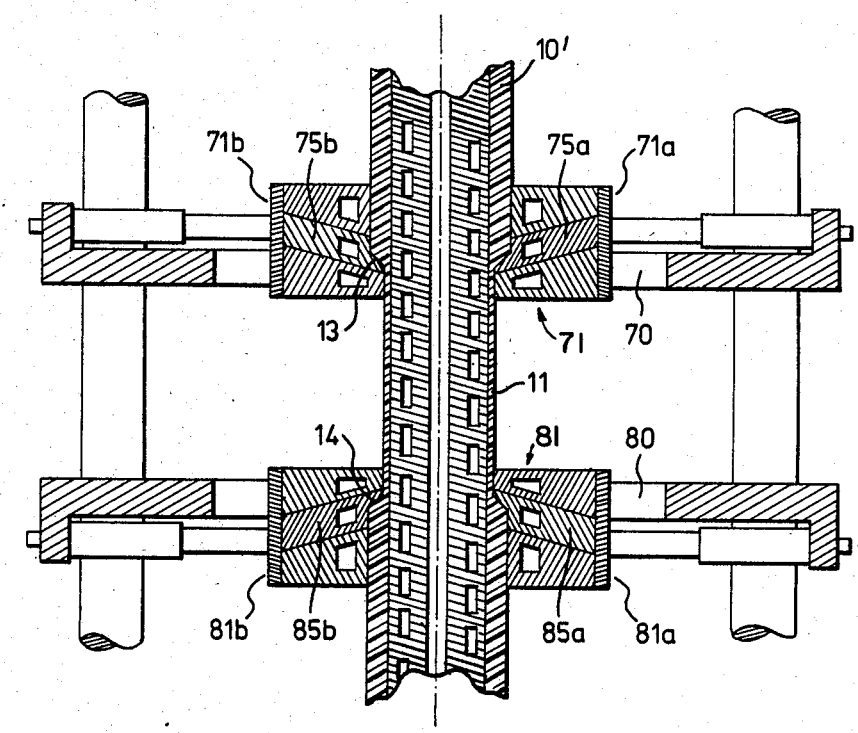
FIG. 3 shows part of a longitudinal section corresponding to FIG. 2, in which the draw rings have been separated from each other.

FIG. 3 shows part of a longtitudinal section which corresponds to central sections of FIG. 2 in which the draw rings have moved or are in the course of moving apart along the axis of the blank, and portrays a central section 11 of a blank in which the thickness of the material in the blank 10' has been reduced. At the transitional zone 13,14 between material with its original wall thickness and material with reduced wall thickness, contact surfaces are formed between the middle draw rings 75a,b,85a,b and the material in the transitional zone. In this way the draw rings are able to control the shape of the transitional surface between material with its original wall thickness and material with reduced wall thickness.

Figure 4:
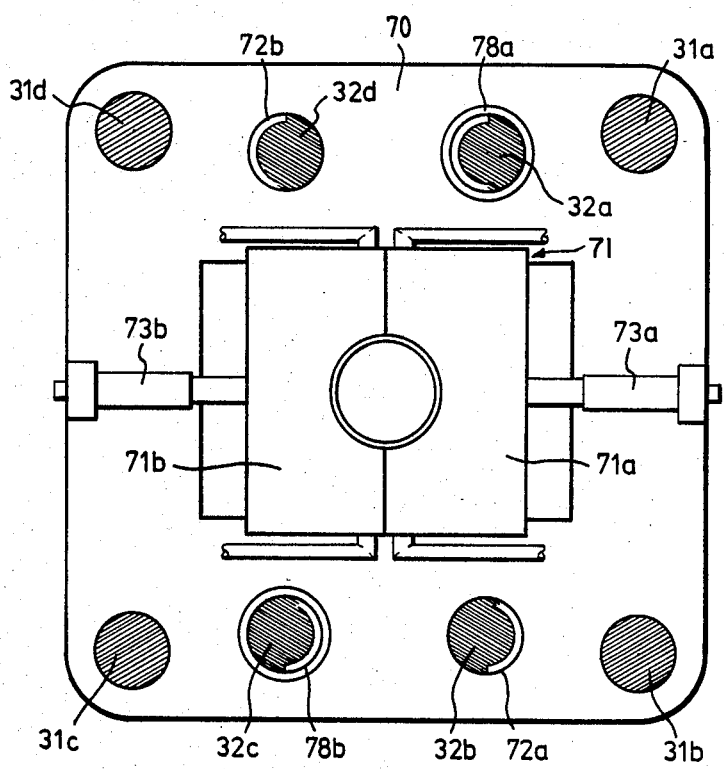
FIG. 4 shows a support plate fitted with a draw ring in its operating position.

FIG. 4 shows the support plate 70 viewed from above and with the draw ring 71 in its closed position. The Figure also illustrates the locations of the bearings for the guide pins 31a–d and openings 78a,b and for the threaded holes 72a,b for the drive screws 32b–d. The other support plates which are fitted with the draw ring 81 or with the clamping devices 51 or 61 are similarly equipped. As has already been mentioned, the clamping device 61 is not divided, and has therefore nothing corresponding to the driving device 73a,b.

Figures 5, 6:
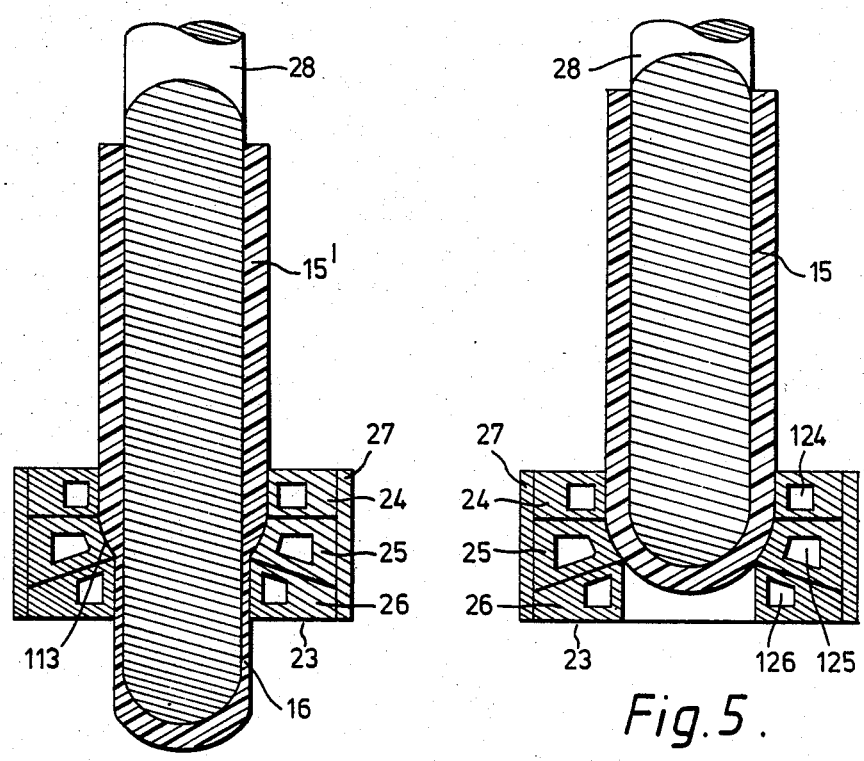
FIG. 5 shows a longitudinal section through a tubular blank with a draw ring in its initial position.
FIG. 6 shows a longitudinal section through a tubular blank during drawing in the direction away from its sealed part.

FIGS. 5 and 6 show a typical application of the present invention in which the wall thickness of a tubular blank 15,15' which is sealed at one end is reduced, starting at the sealed end of the blank. This requires a draw ring 23 to be dimensioned preferably in such a way that both before and at the start of the drawing operation contact will be made between the middle ring section and the upper ring section and the outer surface of the tubular blank. Here too the draw ring is made up of three ring sections 24,25,26 with liquid channels 124,125,126. The ring sections are dimensioned in a similar fashion to the ring sections which have already been described and are held together by a ring casing 27. A mandrel 28 operates in conjunction with the draw ring 23 in the re-shaping of the blank. The mandrel is normally provided with liquid channels, which is not illustrated in FIGS. 5 and 6, however.

FIG. 6 shows the manner in which re-shaping is begun and in which a section 16 of the blank with reduced wall thickness is formed in the lower section of the blank. Re-shaping normally continues until all the material in the cylindrical part of the blank has had its wall thickness reduced. In the event that the mouth has already been formed, which may be the case with an injection-moulded blank, the re-shaping of the blank is, of course, interrupted as the draw ring reaches the mouth. The transitional zone between material with its original wall thickness and material with reduced wall thickness is indicated in FIG. 6 by numeral 113.

FIGS. 7 and 8 show an alternative embodiment of the present invention in which a draw ring 29 is composed of only two ring sections 96a,b,97a,b with separate liquid channels 94a,b,95a,b. In this application too there should preferably be a certain degree of thermal insulation between the ring sections. If necessary, the draw ring may be extended by the addition of a third ring section with a separate liquid channel and which is dimensioned in the manner already described. Here too the draw ring operates in conjunction with an internal mandrel 28, which is normally provided with liquid channels but not shown in the Figures. The draw ring re-shapes the mouth of a tubular blank 17 which is sealed at one end. In an area which is usually quite close to the opening in the blank, there will be a peripheral starting track 19 in which the thickness of the material has been reduced to approximately ⅓ of its original thickness. The starting track is produced in the manner which has already been described.

In FIG. 8 the draw ring 29 has been moved relative to the blank with the help of the mandrel 28 in such a way that a section 18 of the blank with reduced wall thickness is produced adjacent to the opening in the blank 17'.

Figure 9:
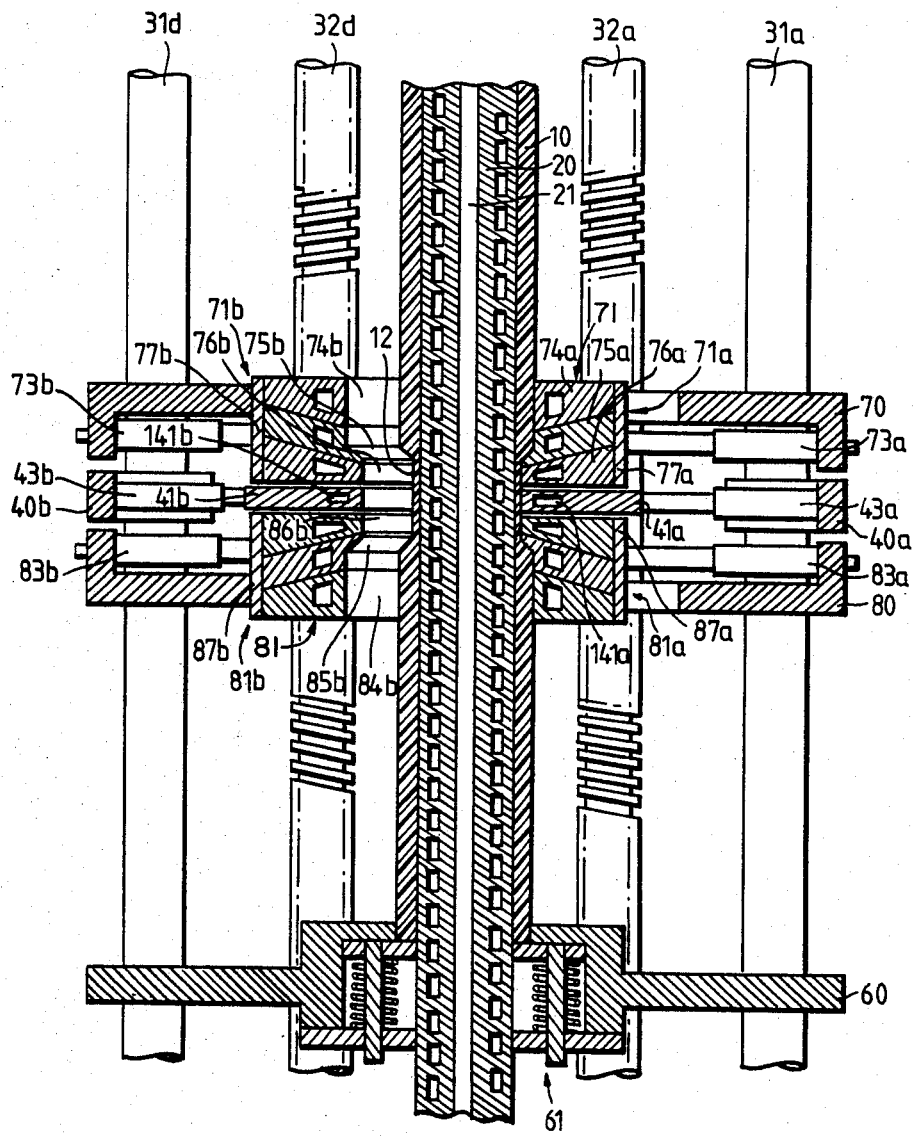
FIG. 9 shows a longitudinal section through a drawing device with a central clamping device and with the draw rings or the clamping device in the initial position before drawing.
Figure 10:
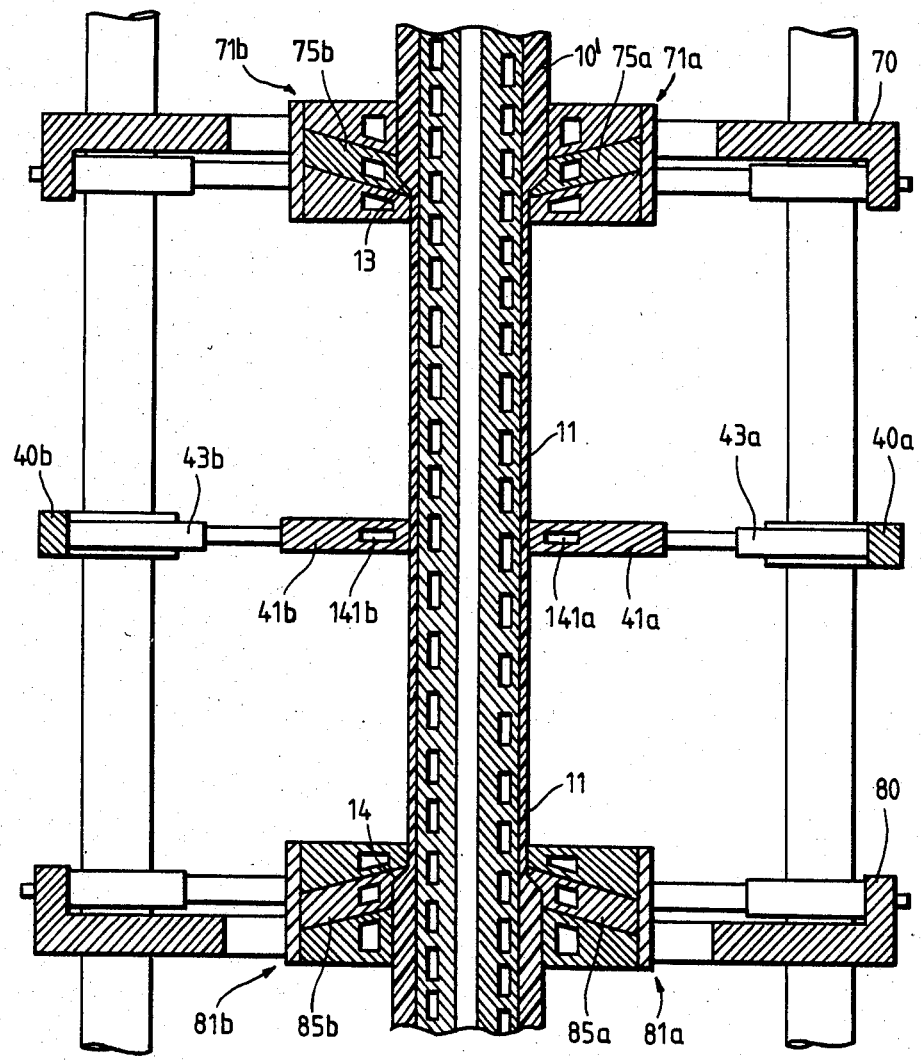
FIG. 10 shows part of a longitudinal section corresponding to FIG. 9 with the draw rings moved apart.

FIGS. 9 and 10 show a further alternative embodiment of the present invention in which a central clamping device 41a,b is located in the area between the draw rings 71 and 81. The clamping device is positioned on a central support plate 40a,b with a fixed position in the device. This fixed position is obtained, for example by attaching the support plate to the guide pins 31a,b. The central support plate is also fitted with driving devices 43a,b for moving the two parts 41a,b of the central clamping device to and from the operating position of the respective parts. In certain embodiments, the central clamping device is provided with liquid channels 141a,b. Other devices shown in FIGS. 9 and 10 correspond to devices shown in FIGS. 1-4, in which case their reference numbers agree with the reference numbers in those Figures. An equivalent device to the clamping device 51 is not present in this embodiment.

Figure 11:
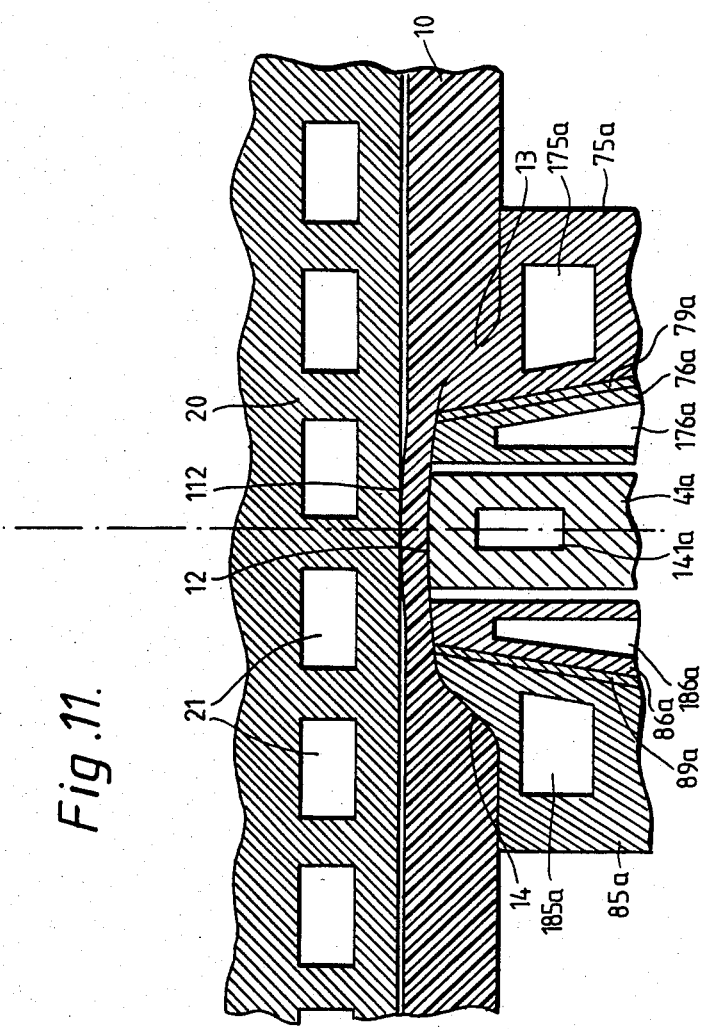
FIG. 11 shows the central area in accordance with FIG. 9 in detail.
Figure 12:
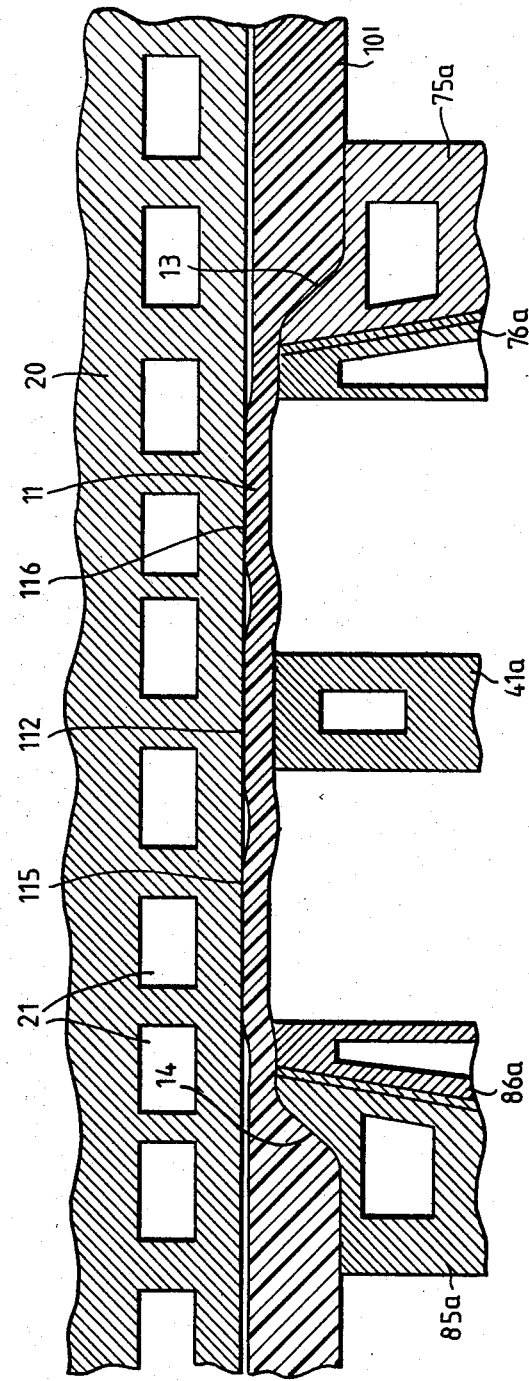
FIG. 12 shows the central area in accordance with FIG. 10 in detail.

FIGS. 11 and 12 show details of the central areas in FIGS. 9 and 10, i.e. those areas in which the wall of the material in the blank is provided with a starting track or in which the wall of the material has undergone a reduction in thickness in conjunction with the movement of the draw rings. The reference character 112 is used to indicate an area of contact between the internal surface of the blank 10,10' and the external surface of the mandrel 20 caused by a certain amount of deformation in the wall of the blank produced by the clamping device 41 a when this is in the operating position. The reference characters 115,116 indicate areas of contact with the mandrel by the internal surface of sections of the material in the blank 10' whose thickness has been reduced by the drawing operation.

In accordance with the present invention the central clamping device 41a,b may be designed in accordance with several alternative embodiments. These are characterized by the fact that the clamping device 41a,b in its operating position surrounds the wall of the blank, thus forming contact surfaces with the external surface of the wall of the blank which are distributed at various points around the periphery of the blank. This distribution of the contact surfaces is produced by the clamping device for example by the surfaces of the clamping device which face the blank not being in the form of cylindrical surfaces of circular cross-section, but rather in the form of cylindrical surfaces of, for instance, elliptical or polygonal cross-section.

Figure 13:
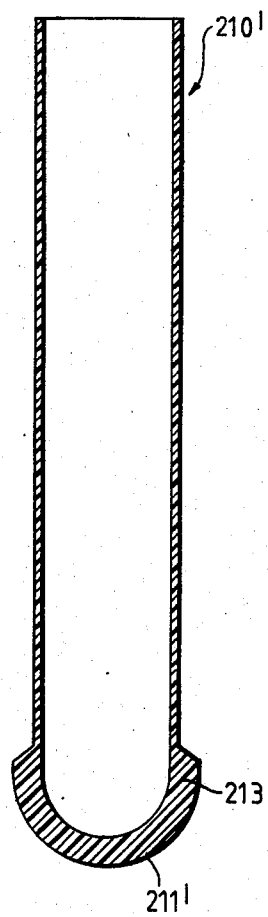
FIGS. 13, 14 and 15 show alternative embodiments.
Figure 14:
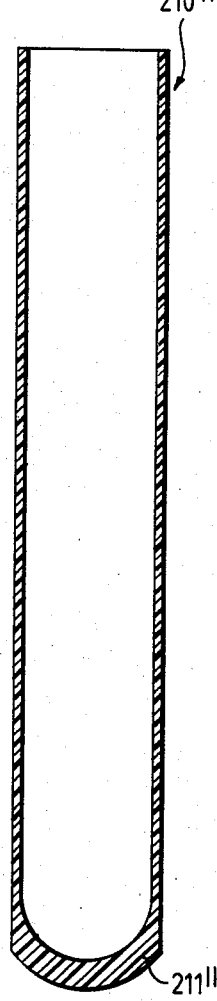
Figure 15:
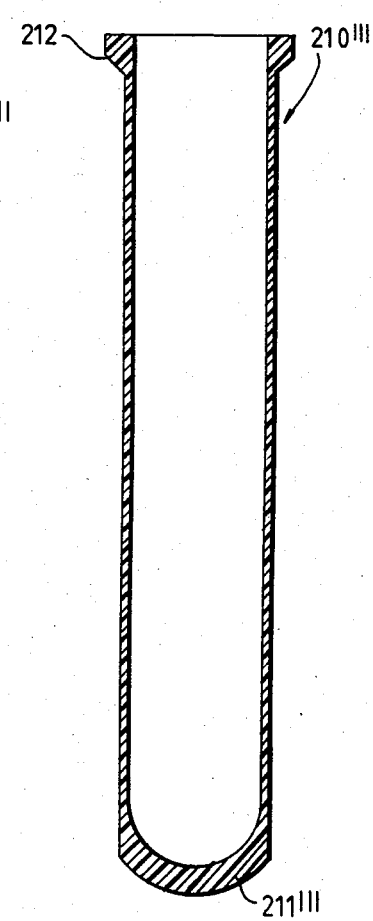

FIGS. 13-15 show examples of objects 210', 210", 210''' in accordance with the invention. The object 210' in FIG. 13 has at its lower part a cylindrical wall section 213 of amorphous material adjacent to a sealed bottom 211' also of amorphous material. FIG. 14 shows object 210" in which the external cylindrical surface has the same diameter along the entire length of the object. The sealed bottom 211" of the object is also of amorphous material in this embodiment. Finally, FIG. 15 shows an embodiment in which the edge of the mouth 212 of the object consists of material with its original thickness, whereas the remaining parts of the object are similar in design to those in FIG. 14.

The blank 10 is positioned over the mandrel 20 in the embodiment of the present invention in accordance with the typical example shown in FIGS. 1-4. The clamping device 51 and the draw rings 71 and 81 will then be in their open position, corresponding to the position shown in the left-hand part of FIG. 2. The blank which is placed around the mandrel forms the contact surfaces with the mandrel. Once the blank is in place and is in contact with the sprung support plate 64 of the lower clamping device 61 the upper clamping device 51 and the draw ring halves are then moved to their closed position. The two draw rings 71 and 81 enter the starting track 12 and in so doing form contact surfaces with the outer wall of the blank where the wall thickness has not been reduced, where the wall thickness has been reduced to its minimum value, and at the transitional zone between the two aforementioned areas.

The material of the blank will preferably be at a high temperature, although preferably below TG, when it is placed on the mandrel. The final temperature of the material is set by the transfer of heat between the mandrel and the blank and/or between the draw rings and the blank. The temperature is controlled by means of the liquid which flows through the liquid channels 21 in the mandrel and/or through the liquid channels 174a,b,175a,b, 176a,b and 184a,b,185a,b,186a,b in the draw rings. The thermal insulation which is present between the ring sections of the draw rings generally maintains a certain difference in temperature between different areas of material in the blank. The ring sections 74a,b,84a,b with the largest internal diameter will, when in the position shown in the right-hand part of FIG. 2, set the material to a temperature in the range of or just below TG, and preferably to a temperature which is no more than 15° C. below TG. The ring sections 75a,b, 85a,b have a similar function, whereas the ring sections 76a,b86a,b preferably will maintain a temperature well below TG, and preferably at a temperature which is at least 15° C. below TG, in order to cool the material once it has undergone the reduction in thickness.

Once the material has reached the specified temperatures the driving devices at the base will begin to rotate the driving screws 32a-d, causing the support plates 50,70 and the associated clamping device 51 and draw ring 71 to move upwards in the figures, and the support plates 60,80 and the associated clamping device 61 and draw ring 81 to move downwards in the figures. The thickness of the material in the blank is thus reduced by the draw rings as long as movement continues. At the same time, the blank will be lengthened axially and this elongation will be proportional to the reduction in the thickness of the material and to the axial movement of the draw rings. The speeds at which the support plates 50 and 60 move are therefore selected in such a way that the positions of the clamping devices 51,61 will match the elongation of the blank. Any irregularities which may occur will be absorbed by the biased support plates 54 and 64.

The middle draw rings 75a,b and 85a,b are in contact with the transitional zone between material with reduced thickness and material with its original thickness. The profile of the middle ring section is selected in such a way that the material during the re-shaping operation will form contact surfaces with the internal surfaces of the ring section. In this way the ring section will control the shape of the transitional surface between material with reduced thickness and material with its original thickness. The ring section also has a temperature regulating function in that the transfer of heat takes place at the aforementioned contact surfaces in such a way that the material in the transitional zone is maintained at a temperature close to TG throughout the entire drawing operation. It is essential, particularly when drawing takes place at high speed or when the material used is very thick, that the middle draw ring should have excellent heat conducting properties so that the material in the transitional zone will not reach too high a temperature.

Once the draw rings have been moved apart so that the central section 11 of the blank will be given a predetermined length, the movement of the support plates is stopped. The driving devices 53a,b,73a,b,83a,b then move the clamping device 51 and the draw rings 71 and 81 to their open position, and the object which has been formed in the manner described is then removed from the mandrel, whereupon a new tubular blank is placed on the mandrel and the operation is repeated.

The section 11 with reduced wall thickness in the finished object forms the central section at which the object is cut in order to produce two symmetrical parts. Each part is then sealed at the end with its original wall thickness, thus producing a preform which may be used, for example, to produce a blow-moulded container. Those sections of the preform which have reduced wall thickness are subsequently re-shaped to form the basis for the mouth of the future container.

In the application of the embodiment of the present invention shown in FIGS. 5 and 6, the function is in principle identical with that described above. The internal mandrel 28 acts as a dolly which takes up those forces which arise as the draw ring 23 is moved axially along the blank. Regulation of the temperature in the different areas of the material is also important in this typical application. The mandrel 28 is normally provided with liquid channels corresponding to the liquid channels 21 in the mandrel 20 shown in FIGS. 2 and 3. In certain typical applications the thickness of all the material in the cylindrical section of the blank is reduced, whilst the re-shaping stops sooner in other typical applications.

The embodiment shown in FIGS. 7 and 8 is applicable in those cases in which it is required to produce a number of areas of material in which the thickness of the material has been reduced. Each such area of material requires a starting track in which the reduction in the thickness of the material may begin. When producing the object the draw ring 29 is moved to an initial starting track and the halves of the draw ring take up their operating position. The draw ring is moved from the starting track over a short distance along the axis of the blank, reducing the thickness of the material until the first section of material with reduced wall thickness has been produced. The draw ring halves are then moved apart and the draw ring is moved to the next starting track, when the draw ring halves take up their new operating position. The draw ring is now moved once more along the axis of the blank in order to produce a new area of material with reduced wall thickness, and so on. The operation is repeated until the desired number of areas with reduced material thickness have been produced.

The blank used in conjunction with the unidirectional drawing described in connection with FIGS. 5–8 is shown as being sealed at one end. In this way the seal will have operated in conjunction with an internal mandrel to absorb the axial forces required during the drawing operation. It is, of course, possible to use external clamping devices which replace the function of the mandrel in this respect. This alternative is used when drawing tubular blanks which are open at both ends.

In the application of the present invention which utilizes the embodiment shown in FIGS. 9–12, the blank 10 is slid over the mandrel 20 until it makes contact with the lower clamping device 61. In this case the latter serves as a means for determining the axial position of the blank, thereby ensuring that the track 12 on the blank adopts a position which is suitable for the positioning of the draw rings 71,81 and for the clamping device 41a,b. This situation corresponds to the left-hand half of FIG. 9. The driving devices 43a,b,73a,b,83a,b then move the clamping device 41a,b and the draw rings 71,81 into contact with the external surface of the blank in and adjacent to the track 12. The temperature conditioning of the material in the blank then takes place in the manner which has already been described, in addition to which in certain typical applications liquid is also caused to flow through the channels 141a,b in the clamping device 41a,b. This situation corresponds to what is shown in the right-hand part of FIG. 9 and in detail in FIG. 11.

In its operating position, the central clamping device 41a,b surrounds the blank 10 in the bottom of the track 12. This forms contact surfaces with the bottom of the track which are divided into a number of areas around the circumference of the blank. The contact pressure present at these surfaces in turn causes the internal surface of the blank and the surface of the mandrel to bear against each other. The bearing surfaces adopt positions which correspond to the distribution of the contact surfaces. The bearing surfaces are produced because the clamping device deforms the shape of the surface defining the internal limits of the blank. The contact pressure of the clamping device is selected in such a way that in the event that the shape is deformed, the thickness of the material in the bottom of the track will remain largely unchanged. A bearing surface is shown in detail in FIG. 12 and is designated by the reference characters 112.

The driving devices in the base 30 (FIG. 1) then rotate the driving screws 32a–d causing the draw rings 71,81 to move apart along the axis of the blank, simultaneously re-shaping the wall of the material and elongating the blank. The friction between the blank and the mandrel at the aforementioned bearing surfaces 112 fixes the position of the blank on the mandrel and ensures that the re-shaping of the blank will take place symmetrically around the track 12. The driving of the support plate 60 is selected in such a way that the clamping device 61 will be away reliably from the end of the tube so as not to have any effect on the elongation of the tube which occurs in conjunction with the reduction in the thickness of the wall of the blank. This operating situation corresponds to FIGS. 10 and 12. FIG. 12 also shows that, in addition to the stretching of the material which occurs during the re-shaping of the wall of the blank, contraction of the blank also takes place, causing its internal surface to be moved into contact with the mandrel 20. These contact surfaces are indicated in the Figure by the reference characters 115,116. The formation of these contact surfaces contributes to the fixing of the position of the blank relative to the mandrel which is achieved with the help of the central clamping device 41a,b. It has been found in the majority of typical applications that additional fixing by means of the contact surfaces 115,116 is not essential to achieving the desired symmetrical re-shaping of the blank The description in the previous paragraph indicates that the alternative embodiment of the invention in accordance with FIGS. 9–12 will permit any desired length of the blank to have the thickness of its material reduced. It is thus possible to reduce the thickness of the material along the entire length of the blank, to interrupt the reduction in thickness immediately before the ends of the blank, or else to reduce the thickness in a number of areas distributed axially along the blank and separated by sections of material in which there has been no reduction in thickness. In each area with reduced material thickness, the reduction of the thickness is begun in a new starting track.

Surprisingly, it has been found that when the blank is re-shaped at the temperatures indicated above, relatively low contact pressure is produced between the material of the blank and the mandrel, for which reason no problems are encountered in removing the moulded object from the mandrel after the moulding operation is completed.

The objects shown in FIGS. 13–15 are examples of objects produced in accordance with the above description. When producing an object in accordance with FIG. 13 the thickness is reduced in one preferred embodiment in a tubular blank which is open at both ends, whereby at the end of the blank which will subsequently be sealed an area of amorphous material is left which is then heated and sealed in accordance with the method described above. FIGS. 14 and 15 relate to embodiments in which an already sealed tubular blank of amorphous material is given cylindrical areas of the walls consisting of essentially monoaxially oriented material. In FIG. 14 the monoaxially oriented material is present around the object over its entire length, whereas in FIG. 15 the edge of the mouth 212 consists of material which has not undergone such orientation.

The concept of the invention also contains the possibility of further increasing the crystallinity by heating the material, over and above the crystallinity which is produced in the material in conjunction with the monoaxial orientation. This crystallinity should not be allowed to continue to such a point that the ability of the material to undergo further re-shaping is impaired in the case of an object which is a preform which will be re-shaped in a subsequent operation to produce a finished article. The crystallinity of an object is normally allowed to reach a maximum level of approximately 30% when the object is to undergo further re-shaping. Crystallinity is preferably allowed to lie between 10-25%, whereas the crystallinity produced by monoaxial orientation will achieve a maximum value of approx. 17%.

It has been assumed in the above description that the reduction in the thickness of the material until it reaches its final value takes place in a single reduction stage. The invention also contains the possibility of reducing the thickness of the material in a number of consecutive reduction stages, before finally reducing the thickness of the material to approximately $\frac{1}{3}$ of its original thickness in a final stage. In this case the draw ring or draw rings will consist of a number of ring sections for the consecutive gradual reduction of the thickness of the material. The embodiment described in this paragraph is used mainly when the material in the blank has a large wall thickness and/or when the draw rings are moved at high speed.

Tubular blanks of circular cross-section have been shown in the above description. The invention may, of course, also be applied to tubular blanks of other cross-sections.

The above description relates to the plastic material polyethylene terephthalate. The values indicated in the description for the reductions in thickness and temperature are therefore also related to this material. A large number of materials of the polyester or polyamide type are known to exist, however, and to have similar characteristics, for which reason the invention as such is also applicable either in whole or in part to these materials, provided that the reductions in thickness and the temperature are adjusted to suit the specific requirements of the respective material. The following are typical materials for which the present invention is suitable, after the indicated adjustments have been made: polyethylene terephthalate, polyhexamethylene adipamide, polycaprolactam, polyhexamethylene sebacamide, polyethylene-2,6- and 1,5-naphthalate, polytetramethylene-1,2-dioxybenzoate, and copolymers of ethylene teraphthalate, ethylene isophthalate, and other similar plastic-polymers.

The crystallinity values stated in the present application relate to the theories disclosed in the publication "Die Makromolekulare Chemie" 176, 2459–2465 (1975).

What is claimed is:

1. Apparatus for producing an object from a tubular blank of amorphous, orientable, thermoplastic material, said apparatus comprising a draw ring for producing in a wall of the blank a transitional zone between a region of thinner material and a remaining thicker portion of the wall or for engaging such a transitional zone already provided in the wall of the blank, driving means for producing relative displacement of said draw ring and said blank only axially of said blank substantially without application of radial force to said blank to move said transitional zone axially along the blank while concurrently axially elongating the blank by increasing the length of the region of thinner material and reducing the length of the thicker portion of the wall to effect crystallization with substantially monoaxial orientation of the thus elongated and reduced thickness of the blank in said region of thinner material and means for providing a flow of a heat transfer fluid during elongation of said blank for controlling the temperature of said blank at said transitional zone during elongation of said blank, the combination of the elongation of said blank by axial movement of the transitional zone with concurrent temperature control at said transitional zone producing said crystallization with substantially monoaxial orientation.

2. Apparatus as claimed in claim 1 wherein the temperature controlling means comprises channel means in said draw ring for flow of fluid therein.

3. Apparatus as claimed in claim 1 comprising a mandrel insertable in said blank and providing a bearing surface for said blank during elongation thereof.

4. Apparatus as claimed in claim 1 wherein said mandrel is provided with channels for flow of fluid therein to control the temperature of the wall of the blank.

5. Apparatus as claimed in claim 3 wherein said draw ring which engages said transitional zone and said driving means which relatively displaces said draw ring and blank cooperate to avoid the application of radical force to said blank which leads to relatively low contact pressure between said blank and said mandrel whereby said mandrel and the shaped blank are separable.

6. Apparatus as claimed in claim 1 comprising a mandrel insertable in said blank and clamping means for holding said blank against said mandrel.

7. Apparatus as claimed in claim 1 comprising a mandrel insertable in said blank for cooperating therewith to act in conjunction with said draw ring means to elongate the blank and reduce the thickness of the wall thereof.

8. Apparatus as claimed in claim 1 wherein said draw ring includes means for engaging the blank to form said transitional zone.

9. Apparatus as claimed in claim 1 comprising means supporting said blank and draw ring for preventing relative rotation thereof during axial elongation of the blank, said draw ring having a substantially continuous annular inner surface bearing against said blank at said transitional zone, and facing said region of thinner material and said region of thicker material.

10. Apparatus for forming a container body of polyethylene terephthalate or similar plastic material from a tubular, amorphous blank having a wall of given thickness, said apparatus comprising means including a shaping element for engaging the wall of the amorphous blank over a portion of the thickness thereof, means for applying axial force to said portion by said shaping element substantially without application of radial force to said blank, means for relatively displacing said shaping element and said tubular blank only axially of said blank to reduce the thickness thereof substantially by the magnitude of said portion of the thickness of the blank which is engaged by the shaping element while elongating said blank to produce crystallization of the material of reduced thickness of the elongated blank substantially with monoaxial orientation and means for providing a flow of a heat transfer fluid during elongation of said blank for controlling the temperature of said blank in the region where it is engaged by the shaping element during elongation of said blank, the combination of the elongation of said blank by only relative axial movement of the shaping element and blank with reduction of the thickness of the blank substantially by the magnitude of said portion of the thickness of the blank engaged by the shaping element together with concurrent temperature control at said portion producing said crystallization with substantially monoaxial orientation.

11. Apparatus as claimed in claim 10 wherein the temperature controlling means comprises channel means in said shaping element for flow of fluid therein.

12. Apparatus as claimed in claim 10 comprising a mandrel insertable in said blank and providing a bearing surface for said blank during elongation thereof.

13. Apparatus as claimed in claim 12 wherein said mandrel is provided with channels for flow of fluid therein to control the temperature of the wall of the blank.

14. Apparatus as claimed in claim 10 comprising a mandrel insertable in said blank and clamping means for holding said blank against said mandrel.

15. Apparatus as claimed in claim 10 comprising a mandrel insertable in said blank for cooperating therewith to act in conjunction with said shaping element to elongate the blank and reduce the thickness of the wall thereof.

16. Apparatus as claimed in claim 15 wherein said means which applies axial force to said portion of the thickness of the blank by the shaping element includes means by which the substantial absence of radial force applied to the blank by said shaping element leads to relatively low contact pressure between said blank and said mandrel whereby said mandrel and the shaped blank are separable.

17. Apparatus as claimed in claim 10 comprising means supporting said blank and shaping element for preventing relative rotation thereof during axial elongation of the blank, said shaping element having a substantially continuous annular inner surface bearing against said blank at said transitional zone, and facing said region of thinner material and said region of thicker material.

18. Apparatus for producing an object from a tubular blank of amorphous, orientable, thermoplastic material, said apparatus comprising a draw ring for producing, in a wall of the blank, a transitional zone between a region of thinner material and a remaining thicker portion of the wall or for engaging such a transitional zone already provided in the wall of the blank, and driving means for producing relative displacement of said draw ring and said blank axially of said blank to move said transitional zone axially along the blank while concurrently axially elongating the blank by increasing the length of the region of thinner material and reducing the length of the thicker portion of the wall to effect an orientation of the thus elongated and reduced thickness of the blank in said region of thinner material, said draw ring including a plurality of ring sections each including transversely movable segments having open, inoperative positions and closed, operative positions and drive means for moving the segments between the open and closed positions.

19. Apparatus as claimed in claim 18 wherein one of said ring sections is shaped to engage the wall of said blank in said region of thinner material and another of said sections is shaped to engage the transitional zone of said blank.

20. Apparatus as claimed in claim 19 wherein each ring section is provided with channel means for flow of fluid therein to effect heat transfer with said blank.

21. Apparatus as claimed in claim 18 wherein said draw ring externally encircles the blank.

22. Apparatus for forming a container body of polyethylene terephthalate or similar plastic material from a tubular, amorphous blank having a wall of given thickness, said apparatus comprising a draw ring for engaging the wall of an amorphous tubular blank over a portion of the thickness thereof, means for applying axial force to said portion by said draw ring and means for relatively displacing said draw ring and said tubular blank axially of said blank to reduce the thickness thereof substantially by the amount of said portion engaged by the draw ring while elongating said blank to produce crystallization of the material of reduced thickness of the elongated blank substantially with monoaxial orientation, said draw ring including a plurality of ring sections each including transversely movable segments having open, inoperative positions and closed, operative positions and drive means for moving the segments between the open and closed positions.

23. Apparatus as claimed in claim 22 wherein one of said ring sections is shaped to engage the wall of said blank in said region of thinner material and another of said sections is shaped to engage a transitional zone of said blank between the region of thinner material and the region of the original thickness of the wall of the blank.

24. Apparatus as claimed in claim 23 wherein each ring section is provided with channel means for flow of fluid therein to effect heat transfer with said blank.

25. Apparatus as claimed in claim 22 wherein said draw ring externally encircles the blank.

* * * * *